Aug. 30, 1966   E. W. GINTER   3,269,289
CAMERA LENS SHADE
Filed July 27, 1964
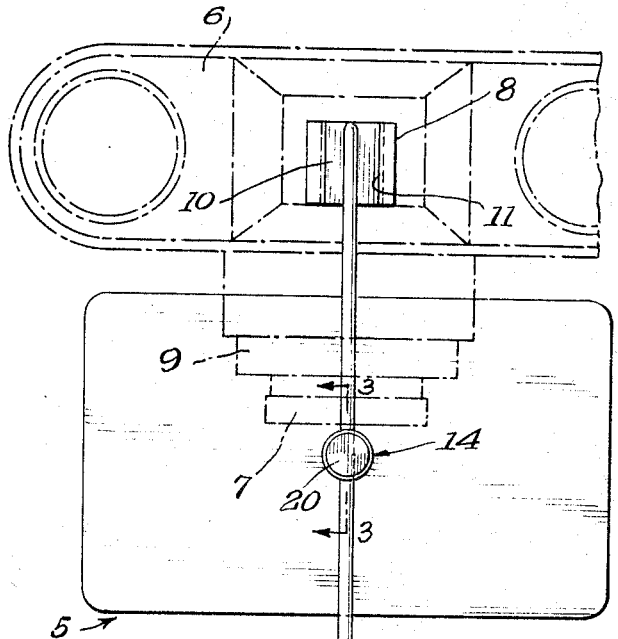
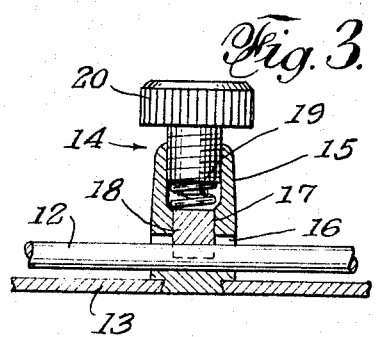
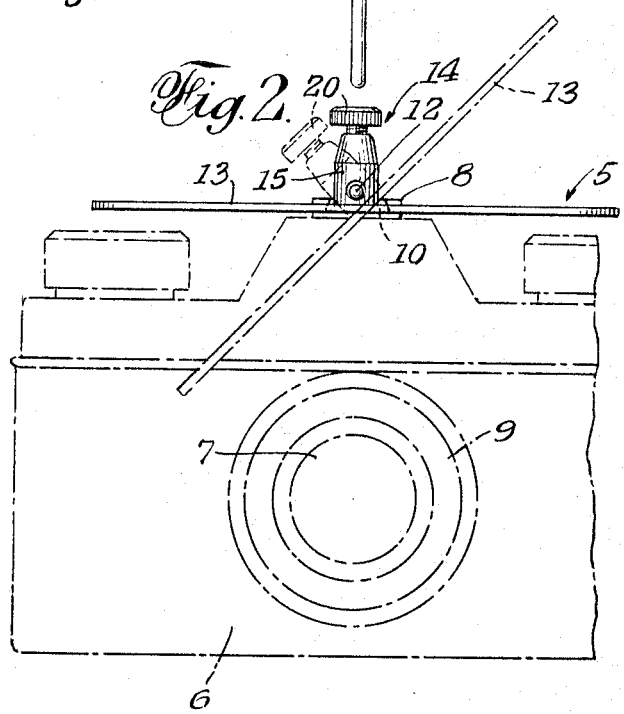
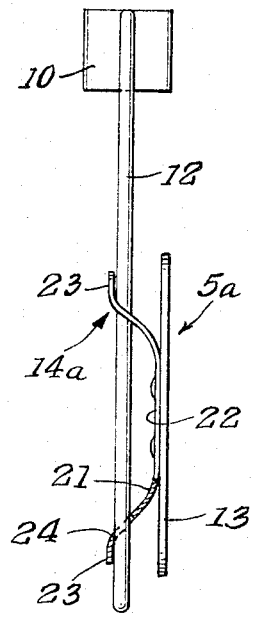
INVENTOR.
EMERY W. GINTER
BY C. G. Stratton
ATTORNEY

United States Patent Office 3,269,289
Patented August 30, 1966

3,269,289
CAMERA LENS SHADE
Emery W. Ginter, 1325 N. Poinsettia Place,
Los Angeles, Calif.
Filed July 27, 1964, Ser. No. 385,373
2 Claims. (Cl. 95—11)

This invention relates to a shade for the lens of a camera and has for an object to provide an attachment that has universal adjustment relative to a camera lens to shade the latter against undesired light.

Another object of the invention is to provide a lens shade, as above characterized, that is mounted for both longitudinal and rotational adjustment and is readily adjusted with one hand while the other is aiming the camera at the subject. Thus, the present lens shade is simple to use and renders picture-taking efficient and free of light-struck exposure.

This invention also has for its objects to provide such means that are positive in operation, convenient in use, easily installed in a working position and easily disconnected therefrom, economical of manufacture, relatively simple, and of general superiority and serviceability.

The above objects are realized in a structure that is formed to be mounted on the ordinary attachment shoe provided in cameras for holding flash equipment. The device has a forwardly extending support rod, a plate, and means interconnecting the rod and plate that enables longitudinal adjustment of the plate along the rod and, therefore, relative to the camera lens, and rotational adjustment of said plate around the axis of the rod and, therefore, to various angular positions relative to the lens. The interconnecting means may be friction-tight to enable retention of the above adjustments or both friction-tight and with a screw lock to insure such retention.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a plan view of a camera lens shade showing a preferred form of the present invention in operative position on a camera.

FIG. 2 is a front elevational view thereof.

FIG. 3 is an enlarged fragmentary cross-sectional view as taken on the line 3—3 of FIG. 1.

FIG. 4 is a side edge view showing a modification.

The present lens shade 5, as in FIGS. 1, 2 and 3, and 5a, as in FIG. 4, is adapted to be applied as a removable attachment to a camera 6 that has a photographing lens 7 and is provided with a shoe 8 for holding attachments. The latter is ordinarily located, as shown, at the top of the camera and rearward of the lens assembly 9 in which the lens 7 is housed.

The lens shade 5 comprises, generally, a mounting plate 10 that has a sliding fit in the channel 11 that is provided in shoe 8 and is frictionally and releasably retained in operative position, a preferably round rod 12 extending forwardly from said plate 10, a lens-shading plate 13, and means 14 adjustably mounting the plate 13 on the rod 12.

The mounting plate 10 is quite conventional and is exemplary of means to separably attach the present lens shade 5 to a camera. The rod 12 extends preferably horizontally from plate 10 to a length suitable for carrying a shade plate 13 in desired shading relation to the camera lens 7.

The lens-shading plate 13 may be flat, as shown, although some transverse curvature may be imparted thereto. Said plate is preferably rectangular but its shape may be varied if such is desired. The same may be made of metal, plastic or other light-intercepting material.

The means 14, as best shown in FIG. 3, may comprise a post 15 having a transverse passage 16 to loosely receive the rod 12 and provided with a longitudinal bore 17 for a slidable shoe 18. The latter engages the rod 12 and is pressed thereagainst by a coil spring 19 that is compressed and released by a screw 20 that has threaded engagement in said bore 17.

It will be seen that slackening of screw 20 will ease the pressure of spring 19 on the shoe 18 and ease the friction of said shoe with the rod 12. It will then be easy to adjust the plate 13 back and forth along rod 12 as well as to various angular positions, as suggested in FIG. 2, around the axis of the rod 12. The screw 20 need only be slackened enough to allow such adjustment of the lens shade, as may be desired, while frictional engagement with the rod 12 is retained by the means 14. Such adjustment will be retained but to lock the same securely, it is only necessary to tighten screw 20 to its maximum.

The means 14a of the form shown in FIG. 4 comprises a leaf spring 21 that is affixed by its middle portion 22 to the plate 13 of the lens shade 5a. The ends 23 of the leaf spring are bent away from plate 13 and are provided with holes 24 of a size to allow the rod 12 to slide therethrough and to turn therein. Said ends 23 are under tension in a direction toward the plate 13, the same being of such magnitude as to produce position-retaining friction of said spring end 23 with the rod 12.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. A camera lens shade comprising:
  (a) a rod having a mounting end and adapted to be separably connected by said end to a camera having a photographing lens,
  (b) a lens-shading plate, and
  (c) means carried by the plate to adjustably mount said plate on the rod,
  (d) the last-mentioned means comprising a leaf spring affixed by its middle portion to the plate, flexible ends on said spring having holes therein through which the rod extends, the spring ends being biased in a direction to frictionally engage the rod.

2. A camera lens shade comprising:
  (a) a rod provided with a mounting end plate adapted to be fixedly and slidingly engaged and separably connected by said plate to a camera having a photographic lens, the rod, when so connected, extending above and forwardly of said lens,
(b) a lens-shading plate, and
(c) a single means including a friction spring and carried by the latter plate to mount said latter plate on the rod for longitudinal adjustment along the rod and angular adjustment around the axis of the rod,
(d) said single mounting means being provided with a manually operable member to compress the friction spring, and with a friction shoe biased by said spring to lock the adjustable plate to the rod, as adjusted.

References Cited by the Examiner
UNITED STATES PATENTS

| | | | |
|---|---|---|---|
| 1,644,781 | 10/1927 | Holman | 88—24 |
| 2,388,995 | 11/1945 | Pollock | 95—11 |

JOHN M. HORAN, *Primary Examiner.*